July 24, 1928.
R. M. GASTON
1,678,335
FLEXIBLE SHAFT
Filed Feb. 28, 1927
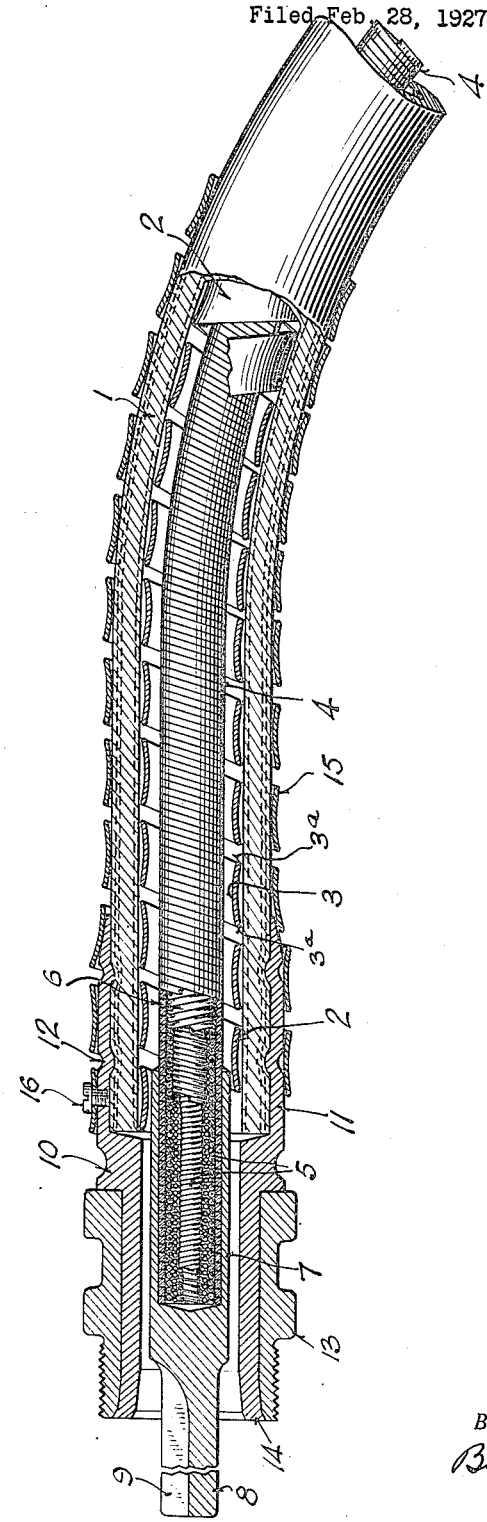
INVENTOR.
RALPH M. GASTON
BY
ATTORNEYS.

Patented July 24, 1928.

1,678,335

UNITED STATES PATENT OFFICE.

RALPH M. GASTON, OF CHICAGO, ILLINOIS, ASSIGNOR TO MALL TOOL COMPANY, OF CHICAGO, ILLINOIS, A CORPORATION OF ILLINOIS.

FLEXIBLE SHAFT.

Application filed February 28, 1927. Serial No. 171,522.

This invention relates to an improvement in flexible shafts of the type employed for rotating tools as well as for other purposes.

Flexible shafts of the type of the present invention usually comprise an outer relatively stationary although flexible housing and an inner rotating and flexible driving core. Usually the housing is of elastic reinforced material such as a suitable rubber compound with embedded fabric and has a coiled metal liner. The driving core is usually made up of a plurality of layers of wire wound one on top of the other. The wire is always round wire and the outer layer of this round wire presents a series of ridges. These ridges engage the hard metal liner and wear away quite rapidly and this wearing is sometimes hastened by the action of more or less sharp corners presented by the metal liner of the housing. The wear occurs, of course, on the outer winding of the core and this is especially disadvantageous as this outer winding takes most of the driving stress. As a result of this wearing of the outer winding of the driving core, the driving core, as heretofore proposed, is comparatively short-lived. One object of the invention is to provide a flexible shaft of this character wherein the driving core is not liable to be subjected to any great amount of wear and is also well adapted to stand up under the driving stress which it takes.

In carrying out this object the driving core has an outer winding of novel construction designed not only to minimize wear but to provide additional strength to withstand the driving stress. The invention also contemplates the construction of the metal liner of the housing in such a manner that it also tends to minimize wear.

Another object resides in the provision of a flexilble driving shaft having these advantages and capacities and which is of simple and durable construction, reliable and effective in operation and easy and comparatively inexpensive to manufacture.

Another object is to provide a flexible shaft having means organized therewith to prevent abrupt bending of the shaft at its ends.

Other objects and advantages reside in certain novel features of the construction, arrangement and combination of parts which will be hereinafter more fully described and particularly pointed out in the appended claims, reference being had to the accompanying drawing forming a part of this specification, and in which:

The figure is a fragmentary view partly in longitudinal section and partly in side elevation showing a portion of a flexible shaft embodying the present invention.

Referring to the drawing wherein for the sake of illustration is shown one form of flexible shaft embodying the present invention, the numeral 1 designates an oil proof housing composed of special rubber mixtures with fabric embedded thereon and providing a strong and light yet oil tight housing. The housing 1 is lined with a hard metal liner 2 consisting of a helically or spirally wound metal tape or strip. As shown, the hard metal liner is of concavo-convex form in cross section so that its inner periphery presents a curved wall 3 which rounds off as at 3ª along the edges of the liner.

A flexible driving core designated generally at 4 is provided and is built up of a plurality of inner windings, or layers 5 which may be of round wire of the kind usually employed for flexible shaft cores or of any other suitable cross sectional shape or kind. These inner windings of round wire are encased in an outer winding or layer 6 of specially constructed wire. The wire making up the outer layer or winder 6 preferably has the form of a parallelogram in cross section and in the embodiment shown the wire of the layer 6 is substantially square in cross section, but this cross section may be varied and all of the advantages obtained just so long as the cross section is such that the faces of the wire of the layer 6 are parallel to each other and just so long as the outer face is flat and smooth. By providing the outer layer of wire having the cross section of a parallelogram at least two distinctive advantages are had. In the first place the outer layer presents a straight smooth surface instead of a series of ridges as would be presented were round wire used. This straight smooth surface is not worn down when engaged by the hard metal liner and as a result the core lasts longer and the life of the flexible shaft is enhanced. The wearing is further minimized by the curved formation of the inner periphery of the convolutions of the hard metal liner and scraping or destructive engagement between the hard metal liner and the outer layer of the core is absolutely precluded.

Another important advantage which results from the use of the outer layer of wire having parallel sides or faces in cross section resides in the fact that this outer layer, when so constructed, has twenty-one per cent more metal for the same winding space, a feature which of itself enhances not only the strength but also the durability of the core. The advantage of having this additional metal in this same winding space, and of precluding or greatly minimizing the wear, will perhaps be better understood when it is borne in mind that the driving strength of a rotating shaft decreases in proportion to the cube of the reduction in diameter. In this connection it is to be understood that while the construction of the wire of the outer layer with a cross section embodying parallel sides has all of these advantages, the use of an outer layer with a smooth straight surface will decrease the wear even though the cross section is otherwise different. Then again the increase in the amount of metal for the winding space may be had even though the cross section be slightly varied from that of a parallelogram, or the sides be slightly other than parallel. As a matter of practice it may be desirable to slightly round off the edges of the wire 6. The wire 6 is wound so that the normal driving strain tends to wind rather than unwind the same. Alternate inner wires are reversely wound.

As shown, the driving core is fitted in and suitably secured to a socket 7 provided at the end of a driving tip 8, the driving tip 8 having a key-way or groove 9 designed to receive a correspondingly formed projection or key on the tool (not shown).

An end piece 10 is provided and has a flange 11 receiving the adjacent end of the housing 1 and secured thereto by the corrugations 12 pressed inwardly or otherwise formed on the flange 11 and embedded in the housing. A coupling member 13 is swiveled on the end piece 10, the coupling member being retained in position by the rolled edge 14 of the end piece, and this coupling member 13 is designed to coact with a mating coupling member usually provided on the tool.

To prevent abrupt bending of the housing adjacent the end piece a reinforcing spring member 15 is provided and consists of a short length of a spiral or helically formed strip of metal similar to the liner, one end of the reinforcing spring member 15 being secured as at 16 to the end piece.

The invention claimed is:

1. A flexible shaft including a housing, a hard metal helical liner therefor having a slightly rounded inner surface of substantial area, and a driving core extending through the housing and located within the liner thereof.

2. A flexible shaft including a housing, a hard metal helical liner therefor having its inner surface of substantial area and formed with edges rounded off outwardly and a driving core having a smooth and continuous outer periphery.

3. A flexible shaft comprising a housing, a hard metal liner therefor made up of a helical strip of concave-convex cross section, and a driving core extending through the housing and located within the liner.

4. A flexible shaft including a flexible housing, a hard metal liner for the housing made up of a series of convolutions, each of which has a slightly rounded inner surface of substantial area and a flexible shaft extending through the housing and located within the liner.

5. A flexible shaft housing having a flexible liner formed with convolutions having convex curved inner facts of substantial area.

6. A flexible shaft housing having a flexible liner formed with convolutions having convex curved inner faces of substantial area, the edges of the convolutions of liner being rounded off.

In witness whereof, I hereto affix my signature.

RALPH M. GASTON.